United States Patent
Hagino et al.

(10) Patent No.: US 8,563,917 B2
(45) Date of Patent: Oct. 22, 2013

(54) PROJECTOR APPARATUS HAVING A COOLING ARRANGEMENT WHICH ENABLES THE APPARATUS TO HAVE A LOW PROFILE

(75) Inventors: Noriyuki Hagino, Shizuoka (JP); Yoshihisa Wada, Shizuoka (JP); Kazuhiro Takai, Aichi (JP)

(73) Assignee: Sony Corporation (JP)

( * ) Notice: Subject to any disclaimer, the term of this patent is extended or adjusted under 35 U.S.C. 154(b) by 330 days.

(21) Appl. No.: 12/932,078

(22) Filed: Feb. 17, 2011

(65) Prior Publication Data

US 2011/0211173 A1    Sep. 1, 2011

(30) Foreign Application Priority Data

Feb. 26, 2010    (JP) ................ P2010-042000

(51) Int. Cl.
*H01J 5/02*    (2006.01)
(52) U.S. Cl.
USPC ............................................. 250/239; 353/61
(58) Field of Classification Search
USPC ........... 250/239, 208.1, 238; 353/61, 119, 57; 348/748
See application file for complete search history.

(56) References Cited

U.S. PATENT DOCUMENTS

| | | | |
|---|---|---|---|
| 6,132,049 A * | 10/2000 | Yamaguchi et al. | 353/61 |
| 6,402,324 B1 | 6/2002 | Kuroda et al. | |
| 7,018,048 B2 | 3/2006 | Ito et al. | |
| 7,255,446 B2 * | 8/2007 | Hamada et al. | 353/61 |

FOREIGN PATENT DOCUMENTS

| | | | |
|---|---|---|---|
| JP | 10-186513 A | | 7/1998 |
| JP | 2000-010191 A | | 1/2000 |
| JP | 2003-121941 A | | 4/2003 |
| JP | 2004-205713 A | | 7/2004 |
| JP | 4020119 B2 | | 12/2007 |

* cited by examiner

*Primary Examiner* — Que T Le
(74) *Attorney, Agent, or Firm* — Lerner, David, Littenberg, Krumholz & Mentlik, LLP

(57) ABSTRACT

A projector apparatus includes: an air intake port taking external air into the body of the apparatus; a duct guiding the external air taken in through the air intake port; a filter horizontally disposed in the duct; and a fan supplying the external air to a heat-generating part from underneath after the external air passes through the filter.

5 Claims, 6 Drawing Sheets

EXEMPLARY INTERNAL CONFIGURATION

EXEMPLARY GENERAL CONFIGURATION

EXEMPLARY INTERNAL CONFIGURATION

PROJECTOR APPARATUS HAVING A COOLING ARRANGEMENT WHICH ENABLES THE APPARATUS TO HAVE A LOW PROFILE

CROSS-REFERENCE TO RELATED APPLICATION

The present application claims priority from Japanese Patent Application No. JP 2010-042000 filed in the Japanese Patent Office on Feb. 26, 2010, the entire content of which is incorporated herein by reference.

BACKGROUND OF THE INVENTION

1. Field of the Invention

The present invention relates to a projector apparatus and, more particularly, to a technique used in a projector apparatus for cooling heat-generating parts of the same by taking external air into the apparatus.

2. Description of the Related Art

An electronic apparatus according to the related art such as projector apparatus for projecting images have a cooling mechanism for suppressing heat generated at internal processing sections as a result of operations of the apparatus by taking external air into the apparatus to cool the same.

When an apparatus takes in cooling air, the external air is sent to a filter to remove particles of dust in the same, and the air is thereafter taken into the apparatus. Particles of dust are removed from air with a filter as thus described to prevent the entry of particles of dust which can adversely affect the apparatus.

A filter of the type described above must receive maintenance such as cleaning or replacement each time the apparatus employing the filter is operated to a certain degree, and the filter is therefore constructed such that it can be inserted and removed in and from the apparatus.

Mechanisms for inserting and removing a filter in and from a projector apparatus according to the related art include relatively simple mechanisms formed by an external air intake port and a filter covering the same, a frame-like element formed by the external air intake port and the filter holding the same serving as an inserting/removing mechanism.

JP-A-10-186513 (Patent Document 1) discloses an exemplary projector apparatus in which a filter 241 is disposed to be attachable to an air intake port as shown in FIG. 3 accompanying the document.

SUMMARY OF THE INVENTION

In the field of projector apparatus, there are demands for reductions in the size of apparatus bodies, and there is also a trend toward projector apparatus bodies having housings with smaller thicknesses.

In order to achieve improved cooling efficiency and obtain a filter having a long life, an external air intake port for taking in cooling air as described above may be provided with a great surface area, and the external air intake port having a great surface area may be covered with a filter having a great surface area. The amount of air flowing through a filter per unit area is smaller, the greater the surface area of the filter. Thus, the clogging of the filter is suppressed, which is advantageous in that the filter cleaning or replacement of the filter can be carried out at longer intervals.

As a result, there are two contradictory requirements to be satisfied, i.e., a reduction in the size of an apparatus body and an increase in the size of a filter. In any configuration according to the related art, either of the requirements is unsatisfied in sacrifice for the fulfillment of the other. For example, in the case of a housing having a low profile, an external air intake port to be used with the housing must be provided with a small surface area when it is to be disposed on a side face of the housing. As a result, a filter disposed in the external air intake port must be provided with a small surface area.

Conversely, when an external air intake port having a great surface area is disposed on a side face of a housing of an apparatus, it is difficult to provide the apparatus housing with a low profile.

Under the circumstance, it is desirable to satisfy the two requirements or to provide a filter having a great surface area and a projector apparatus having a low profile.

According to an embodiment of the invention, there is provided a projector apparatus including an air intake port taking external air into the body of the apparatus, a duct guiding the external air taken in through the air intake port, a filter horizontally disposed in the duct, and a fan supplying the external air to a heat-generating part from underneath after the external air passes through the filter.

In such a configuration, even when the air intake port for taking external air into the apparatus body is provided on a side face of the apparatus, since the filter can be horizontally disposed in a position apart from the air intake port on the side face of the apparatus, the surface area of the filter is not limited by the size of the air intake port.

According to the embodiment of the invention, the surface area of the filter is not limited by the size of the air intake port, and the surface area is not limited also by the height of the apparatus. Thus, the filter can be provided with a great surface area. It is therefore possible to satisfy the above-described two requirements or to provide a filter having a great surface area and a projector apparatus having a low profile.

DESCRIPTION OF PREFERRED EMBODIMENTS

Embodiments of the invention will now be described. The following items will be described in the order listed.

1. Overall Configuration of Projector Apparatus (FIGS. 1 to 4)

Figure 5:
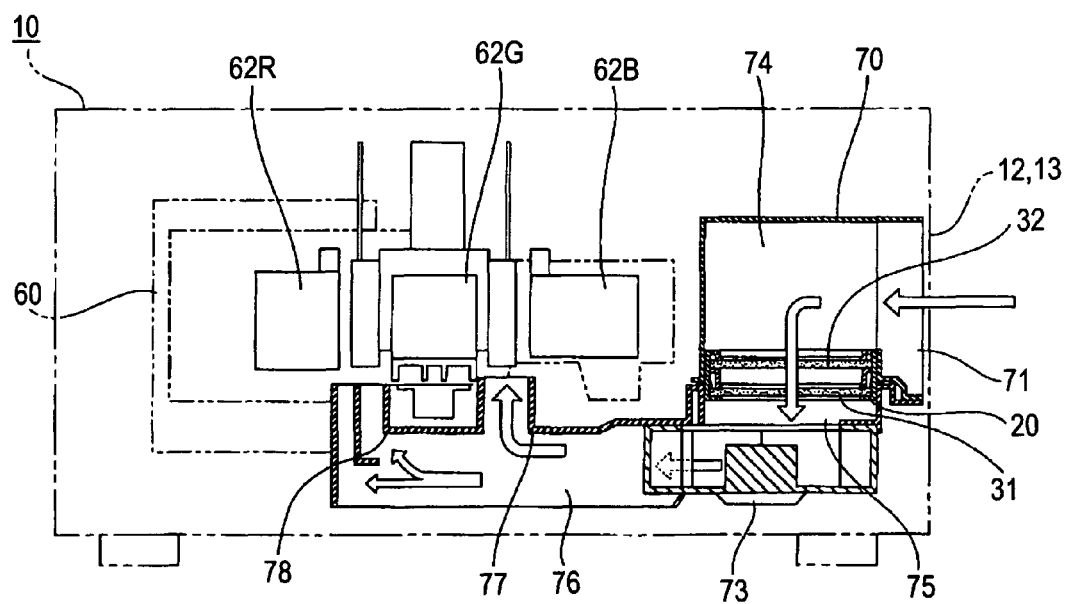
FIG. 5 is a sectional view taken along the line A-A in FIG. 2.

2. Flow of Air taken through Air Intake Port (FIG. 5)

3. Configuration of Filter (FIGS. 6 and 7)
4. Modifications

[1. Overall Configuration of Projector Apparatus]

Figure 1:
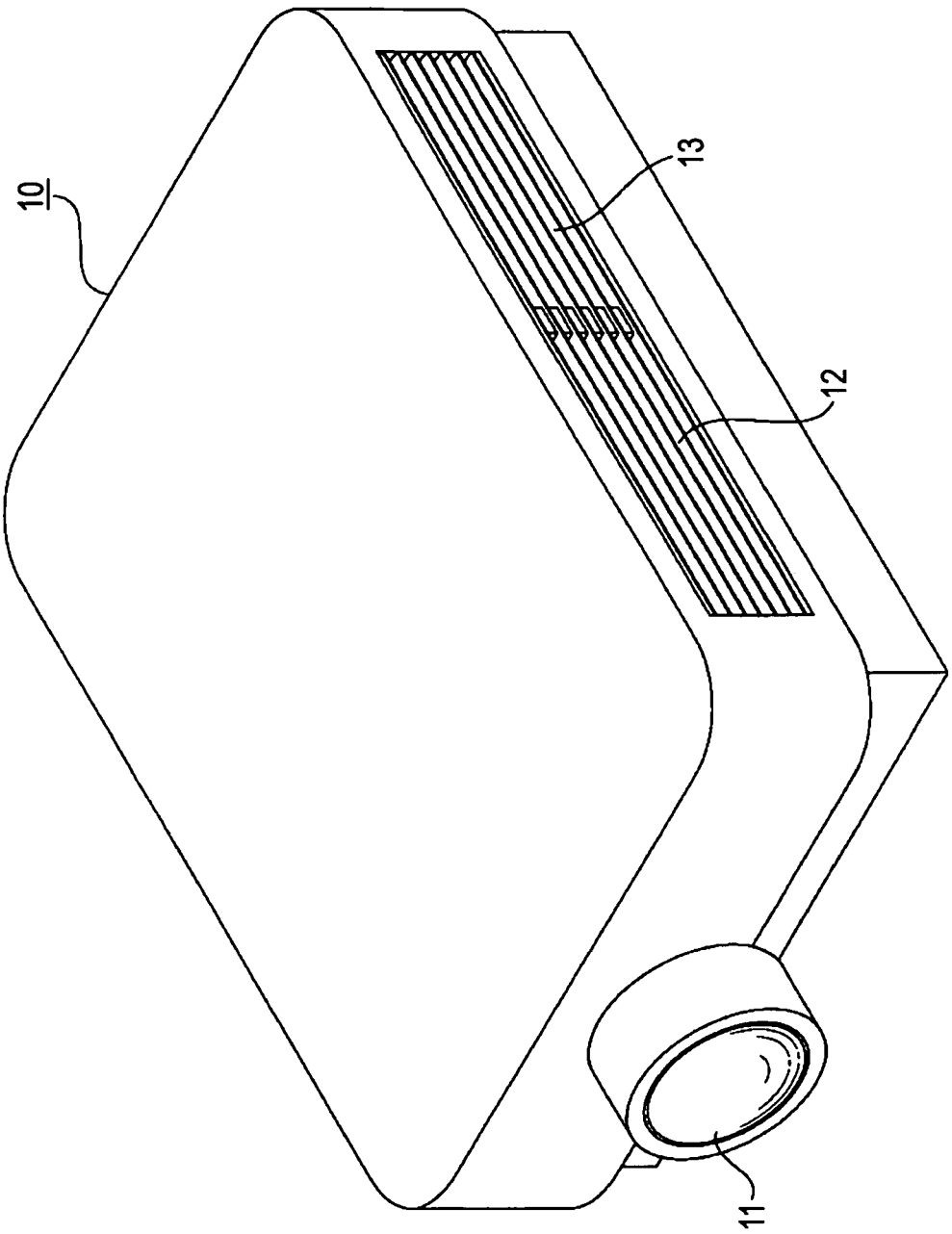
FIG. 1 is a perspective view of a projector apparatus according to an embodiment of the invention showing an exemplary general configuration thereof.

FIG. 1 is an illustration showing an overall configuration of a projector apparatus according to an embodiment of the invention.

The preset embodiment is a projector apparatus which displays an image as follows. An optical block provided in the apparatus irradiates a display panel with light from a light source. Image light (projection light) of an image to be displayed formed by transmitting or reflecting the light from the light source at the display panel is projected on a screen through a projection lens to display the image.

As show in FIG. 1, a projection lens 11 is mounted on a front end of the body of a projector apparatus 10, the body being formed by a box-like housing. Projection light exits the projection lens 11.

Two air intake ports 12 and 13 are disposed on a side face of housing such that they extend side by side in the horizontal direction. Air taken through the air intake ports 12 and 13 blows on an optical block 60 in the projector apparatus 10 as a cooling air flow. Details of a configuration for passing the intake air to the block will be described later.

Figure 2:
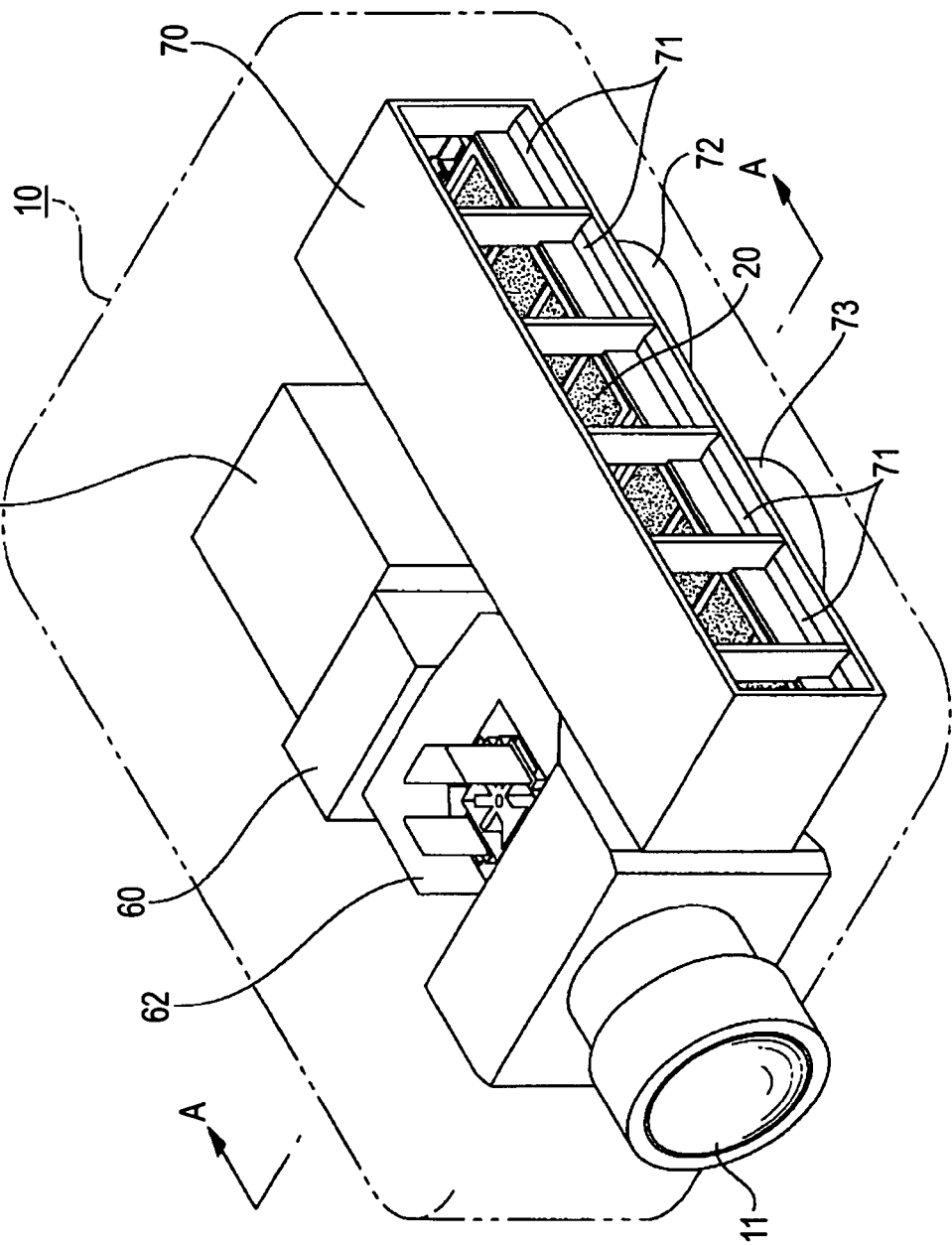
FIG. 2 is a perspective view of the projector apparatus according to the embodiment of the invention showing an exemplary internal configuration thereof.
Figure 3:
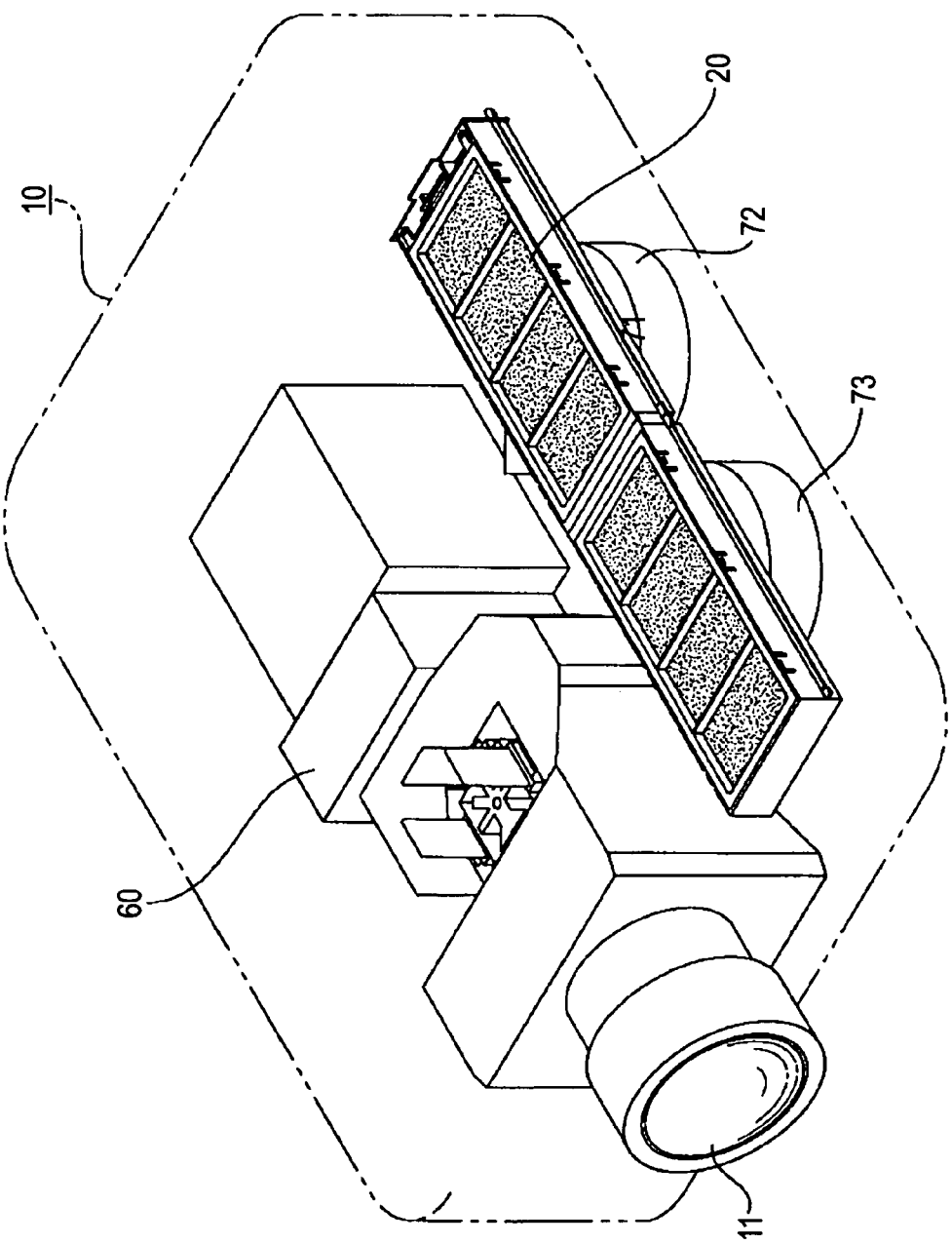
FIG. 3 is a perspective view of the projector apparatus according to the embodiment of the invention showing the exemplary internal configuration thereof (with a duct omitted in illustration)

FIGS. 2 and 3 are illustrations showing the external shape of the optical block 60 in the projector apparatus 10 and showing a duct section 70 disposed beside the optical block 60. The external shape of the projector apparatus 10 (the shape of the housing) is represented by an imaginary line (two-dot chain line). A filter member 20 is horizontally disposed in the duct section 70 shown in FIG. 2. FIG. 3 shows the configuration of the apparatus with the duct section 70 omitted (to show the filter member 20).

As shown in FIG. 2, the duct section 70 has a plurality of openings 71 provided in series on a side of the same associated with the position where the air intake ports 12 and 13 show in FIG. 1 are disposed, and the filter member is disposed at the bottom of the duct section 70. The height of the openings 71 in the vertical direction is substantially equal to the height of the air intake ports 12 and 13.

Further, two Scirocco fans 72 and 73 are disposed under the filter member 20 to cause air filtered through the filter member 20 to blow on the bottom of the optical block 60 disposed adjacent to the duct section. The two Scirocco fans 72 and 73 blow external air on a part of the optical block 60 where a display panel section 62 is disposed, i.e., a heat-generating part of the optical block 60 to cool the part. In the present embodiment, three display panels are disposed to form the display panel section 62, and the two Scirocco fans 72 and 73 supply air to the three display panels in cooperation with each other. Air is also supplied from the Scirocco fans 72 and 73 to a light source section 61, which is another heat-generating part of the optical block 60, to cool the section.

As will be apparent from the disposition of the filter member 20 illustrated in FIG. 3, the two Scirocco fans 72 and 73 are disposed directly under the filter member 20.

Figure 4:
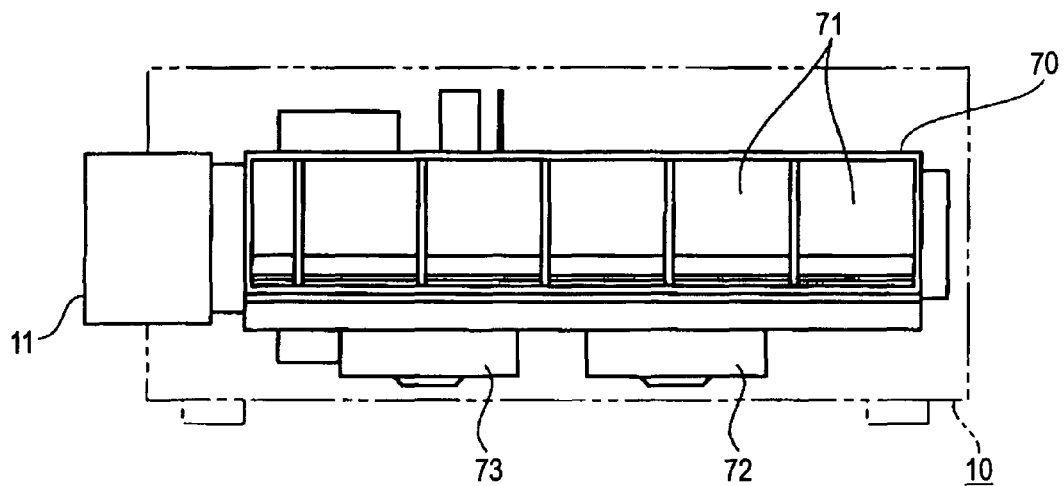
FIG. 4 is a side view of the projector apparatus according to the embodiment of the invention showing the exemplary internal configuration thereof.

Further, as shown in the side view of FIG. 4, the two Scirocco fans 72 and 73 are disposed under the duct section 70 such that they are arranged side by side in the longitudinal direction of the duct section 70.

Therefore, external air taken in through the openings 71 of the duct section 70 (or the air intake ports 12 and 13) reaches the Scirocco fans 72 and 73 after passing through the filter of the filter member 20. Thus, the air is supplied to the Scirocco fans 72 and 73 with particles of dust removed from the same.

[2. The Flow of Air from Intake Ports]

FIG. 5 is a sectional view taken along the line A-A in FIG. 2, and FIG. 5 shows a configuration associated with the flow of air supplied to the optical block 60.

A section of the Scirocco fan 73 is shown in FIG. 5 to indicate the position of the fan.

As show in FIG. 5, air taken in through the openings 71 in communication with the air intake ports 12 and 13 on a side face of the apparatus body enters a first space 74 in the duct section 70. The air is supplied to the two Scirocco fans 72 and 74 after passing through the filter member 20 disposed at the bottom of the first space 74. FIG. 5 shows the position of one of the fans, i.e., the Scirocco fan 73.

Air sucked out by the Scirocco fan 73 is guided to a region directly under the optical block 60 by a duct section 76 which is connected to an output portion of the Scirocco fan 73. The air is further guided by upwardly open duct sections 77 and 78 such that the air flows through the neighborhood of positions where display panels 62R, 62G, and 62B are disposed.

In the present embodiment, the optical block 60 includes the display panel 62R for displaying red, the display panel 62G for displaying green, and the display panel 62B for displaying blue. External air is supplied to the neighborhood of each of the panel 62R, 62G, and 62B to cool the same. Although not shown in FIG. 5, external air from the other Scirocco fan, i.e., the Scirocco fan 72 is also supplied to the neighborhood of the position where the display panels 62R, 62G, and 62B are disposed.

The air supplied to the positions of the display panels 62R, 62G, and 62B thereafter passes through the light source section 61 of the optical block 60 to be discharged to the outside through a discharge port (not shown) of the projector apparatus 10.

As will be understood from FIG. 5, the filter member 20 of the present embodiment has a lateral width (width in the horizontal direction of FIG. 5) greater than the height of the openings 71 (or the height of the air intake ports 12 and 13), and the surface area of the filter member 20 is greater than the areas of the opening 71 and the air intake ports 12 and 13.

[3. Configuration of Filter]

An exemplary configuration of the filter member 20 of the present embodiment will now be described with reference to FIGS. 6 and 7.

Figure 6:
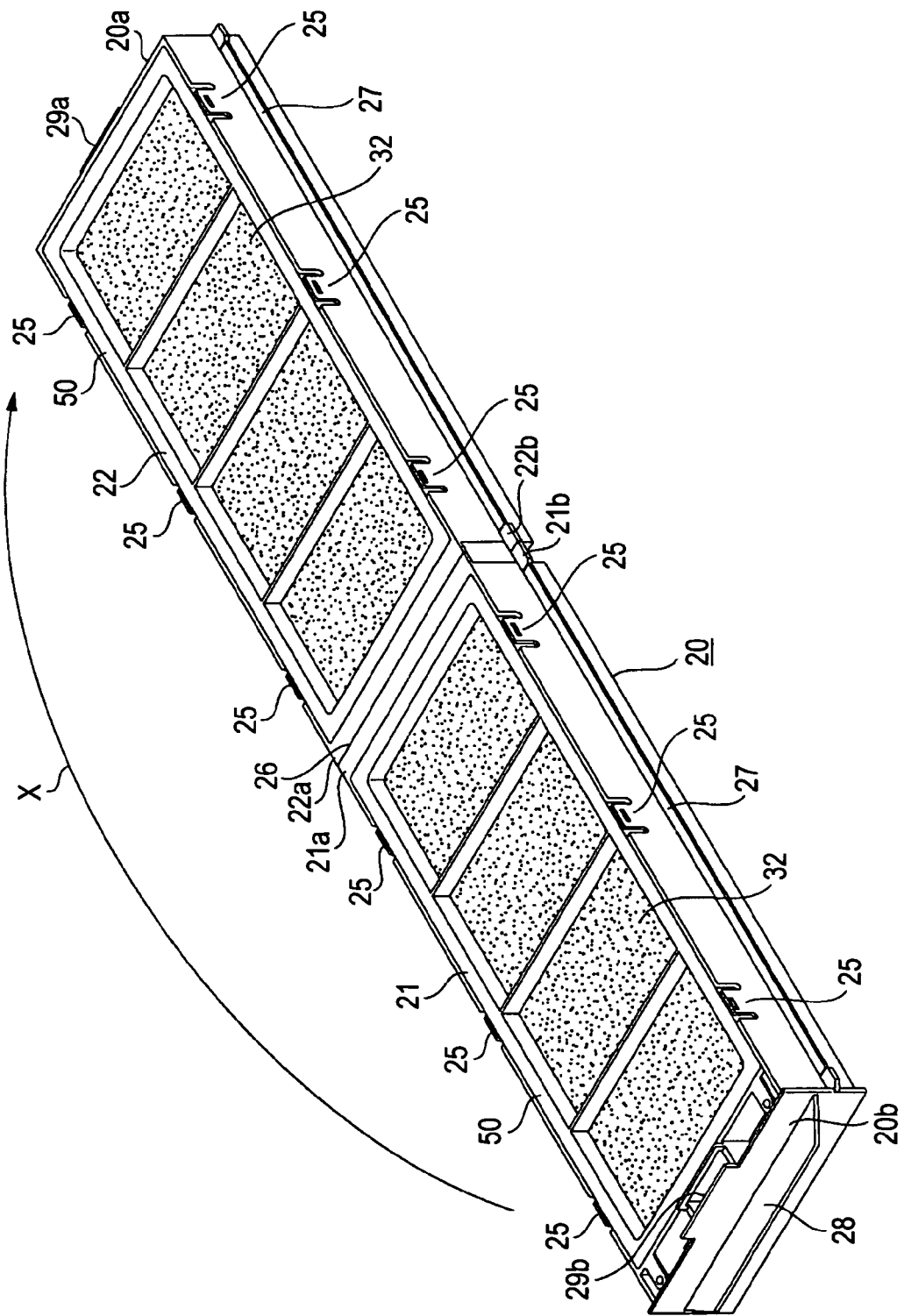
FIG. 6 is a perspective view showing an exemplary configuration of a filter member according to the embodiment of the invention.
Figure 7:
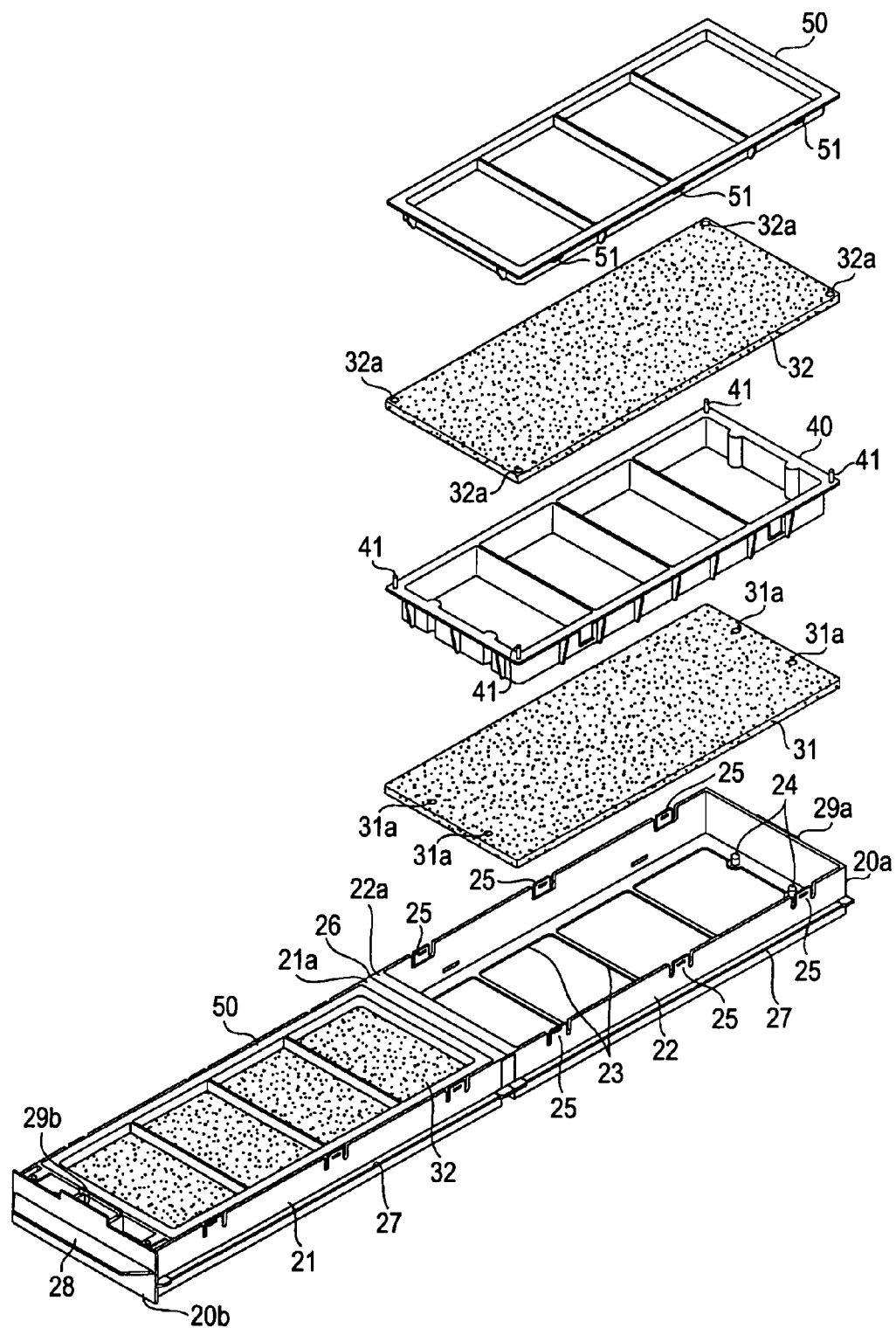
FIG. 7 is a partially exploded perspective view of the filter member shown in the example in FIG. 6.

FIG. 6 is a general perspective view of the filter member 20, and FIG. 7 shows an exploded view of a second filter holding portion 22 with a first filter holding portion shown in an assembled state. The first filter holding portion 21 and the second filter holding portion 22 have the same configuration for holding the filter, the configuration being shown in the exploded view of the second filter holding portion 22 in FIG. 7.

As shown in FIG. 6, the filter member 20 is formed by connecting the first filter holding portion 21 and the second filter holding portion 22 at a connecting portion 26 such that holding portions are integrated to extend straightly, each of the holding portions being formed from a resin. The connecting portion 26 is a bendable and rotatable connecting portion. Specifically, as shown in FIG. 6, the connecting portion 26 is formed by connecting an end 21a of the top surface of the first filter holding portion 21 with an end 22a of the top surface of the second filter holding portion 22 using a resin film having a thickness smaller than the thickness of the regions of the holding portions surrounding the same. Since the connecting portion 26 has a small thickness as thus described, the first filter holding portion 21 and the second filter holding portion 22 can be folded toward each other.

For example, as indicated by the arrow X in FIG. 6, the filter member 20 can be folded such that one end 20b of the filter member 20 is put in contact with another end 20a of the same.

When the filter member is folded such that the top surface of the first filter holding portion 21 is put into contact with the top surface of the second filter holding portion 22, an engaging part 29a provided at the end 20a engages an engaging part 29b provided at the other end 20b to keep the member in the folded state.

When a filter member 20 is transported to be mounted to an apparatus or to be used as a replacement for maintenance, the member can be transported in such a folded state. The elongate filter member 20 can be transported with its length shortened as thus described.

When the first filter holding portion 21 and the second filter holding portion 22 are arranged in the straight state as shown in FIG. 6, an end of a protrusion 21b of the first filter holding portion 21 and an end of a protrusion 22b of the second filter holding portion 22 abut on each other in a position lower than the connecting portion 26. The abutment between the ends of the protrusions 21b and 22b regulates the first filter holding portion 21 and the second filter holding portion 22 to prevent the holding portions from being folded in the opposite directions. Specifically, although the first filter holding portion 21 can be folded or lifted upward as indicated by the arrow X, the first filter holding portion 21 can not be folded downward.

Ribs 27 are provided on both lateral surfaces of each of the first filter holding portion 21 and the second filter holding portion 22 of the filter member 20. FIGS. 6 and 7 show the ribs 27 provided on one side of the filter holding portions with the ribs on the other side omitted.

When the filter member 20 is inserted into a filter insertion hole 16 as shown in FIG. 1, the ribs 27 fit in grooves 16a provided on the duct section 70 as will be described later to allow the filter member 20 to be slid linearly.

The mechanism of the first filter holding portion 21 and the second filter holding portion 22 for holding filters 31 and 32 will now be described with reference to FIG. 7. As described above, the first filter holding portion 21 and the second filter holding portion 22 hold the filters 31 and 32 using the same configuration. The disposition of a filter in the second filter holding portion 22 will now be described with reference to FIG. 7, and the description completely applies to the first filter holding portion 21.

As shown in FIG. 7, a holding frame 23 is provided at the bottom of a frame made of resin which constitutes the second filter holding portion 22, and the filter 31 is supported by the holding frame 23 at a bottom surface thereof.

The filter 31, which is constituted by a sponge-like resin sheet or nonwoven fabric, is placed on the holding frame 23.

The filter 31 has holes 31a provided in four positions near edges thereof, and protrusions 24 provided on the holding frame 23 in four inward positions thereof are inserted into the holes 31a of the filter 31 to secure the filter 31 in place.

A frame-like spacer 40 constituted by a resin member is disposed on the filter 31, and the filter 32 is disposed on the spacer 40. The filter 32 is also constituted by a sponge-like resin sheet or nonwoven fabric, but the filter 31 is formed from a material having finer pores through which air is allowed to pass when compared to the filter 32.

The filter 32 also has holes 32a provided at four corners thereof, and protrusions 41 provided at four corners of the spacer 40 are inserted into the holes 32a of the filter 32 to secure the filter 32 in place.

Further, a presser member 50 is placed on the filter 32 to press the top surface of the filter 32. The presser member 50 has three protrusions provided in three positions on each side thereof, and the protrusions 51 are engaged with respective anchoring parts 25 provided in six locations on side faces of the body of the second filter holding portion 22 to secure the presser member 50, whereby the filters 31 and 32 are secured in place.

Two filters 31 and 32 are disposed in each of the first filter holding portion 21 and the second filter holding portion 22 such that the filters are spaced from each other at a predetermined interval. Thus, particles of dust included in air taken from the outside are removed by the four filters in total.

In the projector apparatus 10 of the present embodiment, as described above, the air intake ports 12 and 13 for taking cooling air into the apparatus are disposed on side faces of the apparatus body, and the filters are horizontally disposed in positions somewhat apart from the air intake ports 12 and 13. Therefore, even if the apparatus body is provided with a low profile and the height of the air intake ports on the side faces is small, the surface area of the filters can be made greater then the areas of the air intake ports. Thus, the filters can be provided with a long life even though the apparatus body has a low profile.

Air which has passed through the filter member 20 is guide by the fans provided under the filers to a region under the display panels which are heat-generating parts of the optical block, and the cooling air is blown on the heat-generating parts from underneath, whereby the apparatus can be efficiently cooled.

In the present embodiment, the filter member 20 includes the two filters 31 and 32 which are disposed at an interval from each other, and the material of the filters 31 and 32 are different in coarseness. Large particles of dust are removed when eternal air first passes through the filter 32, and smaller particles of dust are thereafter removed by the finer filter 31. Thus, the embodiment is advantageous in that the air filters are capable of cleaning air with very high efficiency. In addition, since each of the filters 31 and 32 having a relatively great surface area as thus described is horizontally disposed, the projector apparatus can be provided with a low profile.

[4. Modifications]

While the above-described embodiment is an application of the invention to a filter for cleaning cooling air for a projector apparatus which projects images, the invention may be applied to other types of electronic apparatus which must take external air into themselves.

The positions of the air intake ports on the body of a apparatus such as a projector apparatus shown in FIG. 1 and other figures are merely examples, and the invention is not limited to such positions of air intake ports. While Scirocco fans are used as fans for distributing filtered air in the above-described embodiment, fans having different configurations may alternatively be used.

Each of the filter holding portions 21 and 22 holds two filters 31 and 32 in the above-described configuration, but the configuration is merely an example. Each filter holding portion may alternatively be configured such that only one filter is disposed therein.

It should be understood by those skilled in the art that various modifications, combinations, sub-combinations and alterations may occur depending on design requirements and other factors insofar as they are within the scope of the appended claims or the equivalents thereof.

What is claimed is:

1. A projector apparatus comprising:
   an air intake port taking external air into a body portion of the apparatus;

a duct guiding the external air taken in through the air intake port;

a filter disposed in the duct; and a fan supplying the external air to a heat-generating part from underneath after the external air passes through the filter, in which the air intake port is disposed only on a side face of the body portion and in which the filter is horizontally disposed in the duct such that an entire surface area portion of the filter through which the external air in the duct flows is substantially parallel to a bottom face of the body portion, such that the entire surface area portion of the filter is substantially perpendicular to the air intake port on the side face of the body portion.

2. A projector apparatus according to claim 1, wherein the air intake port is disposed to continuously extend in a horizontal direction on the side face of the body portion; and the filter has a length corresponding to the length of the air intake port and a width equal to or greater than a height of the air intake port in a vertical direction.

3. A projector apparatus according to claim 2, wherein the heat-generating part is in a location where an image display panel of an optical block is disposed; and the fan is a plurality of fans disposed under the filter.

4. A projector apparatus according to claim 1, wherein the filter has a first holding portion and a second holding portion, in which the first holding portion and the second holding portion are connected together by a rotatably connecting portion which enables the first holding portion and the second holding portion to be folded toward each other.

5. A projector apparatus according to claim 4, wherein each of the first holding portion and the second holding portion has a plurality of filter elements.

\* \* \* \* \*